United States Patent
Lindberg et al.

(10) Patent No.: US 10,798,420 B2
(45) Date of Patent: Oct. 6, 2020

(54) LOSSLESS COMPRESSION TECHNIQUES FOR SINGLE-CHANNEL IMAGES

(71) Applicant: Apple Inc., Cupertino, CA (US)

(72) Inventors: Lars M. Lindberg, Bjaerred (SE); Ali Sazegari, Cupertino, CA (US); Paul S. Chang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/683,558

(22) Filed: Aug. 22, 2017

(65) Prior Publication Data

US 2018/0249183 A1     Aug. 30, 2018

Related U.S. Application Data (60) Provisional application No. 62/465,069, filed on Feb. 28, 2017.

(51) Int. Cl.

| | |
|---|---|
| *H04N 19/66* | (2014.01) |
| *H04N 19/593* | (2014.01) |
| *H04N 19/48* | (2014.01) |
| *H04N 19/59* | (2014.01) |
| *H04N 19/436* | (2014.01) |

(52) U.S. Cl.
CPC .......... *H04N 19/66* (2014.11); *H04N 19/436* (2014.11); *H04N 19/48* (2014.11); *H04N 19/59* (2014.11); *H04N 19/593* (2014.11)

(58) Field of Classification Search
CPC ...... H04N 19/66; H04N 19/436; H04N 19/48; H04N 19/59; H04N 19/593
See application file for complete search history.

(56) References Cited

U.S. PATENT DOCUMENTS

| 8,446,960 | B2 | 5/2013 | Marpe et al. |
| 2009/0226084 | A1 | 9/2009 | Courchesne et al. |
| 2011/0080947 | A1* | 4/2011 | Chen .................. H04N 19/13 |
| | | | 375/240.12 |
| 2014/0369614 | A1 | 12/2014 | Fenney |
| 2015/0264364 | A1 | 9/2015 | Zhang et al. |

(Continued)

*Primary Examiner* — David F Dunphy
(74) *Attorney, Agent, or Firm* — Dickinson Wright RLLP (57) ABSTRACT

Disclosed herein are techniques for performing lossless compression of single-channel images (e.g., grayscale images). A first technique involves pre-processing an isolated (i.e., one) single-channel image for compression. In particular, the first technique involves calculating predicted pixel intensity values (within the single-channel image) based on neighboring pixel intensity values (also within the single-channel image). Bit values of the error margins of the predicted pixel intensity values are separated into two different byte streams according to a particular ordering, whereupon the byte streams are separately compressed (e.g., using a Lempel-Ziv-Welch (LZW)-based compressor) and joined together to produce a compressed single-channel image. A second technique involves pre-processing a group of single-channel images into one single-channel image for compression. In particular, the second technique involves interleaving pixel intensity values of the single-channel images to produce an interleaved single-channel image, and subsequently compressing the interleaved single-channel image (e.g., using an LZW-based compressor).

20 Claims, 8 Drawing Sheets

(56) References Cited

U.S. PATENT DOCUMENTS

2018/0075574 A1\*  3/2018  Brennan .................. G06T 1/60
2018/0352239 A1   12/2018  Lindberg et al.
2018/0352243 A1   12/2018  Lindberg et al.

\* cited by examiner

LOSSLESS COMPRESSION TECHNIQUES FOR SINGLE-CHANNEL IMAGES

CROSS-REFERENCE TO RELATED APPLICATIONS

The present application claims the benefit of U.S. Provisional Application No. 62/465,069, entitled "LOSSLESS COMPRESSION TECHNIQUES FOR SINGLE-CHANNEL IMAGES," filed Feb. 28, 2017, the content of which is incorporated herein by reference in its entirety for all purposes.

FIELD OF INVENTION

The embodiments described herein set forth different techniques for performing lossless compression of single-channel images (e.g., grayscale images, infrared images, etc.). In particular, the techniques involve pre-processing single-channel images (i.e., prior to compression) in a manner that can enhance resulting compression ratios when the pre-processed single-channel images are compressed using lossless compressors (e.g., Lempel-Ziv-Welch (LZW)-based compressors).

BACKGROUND

Lossless image compression techniques involve exploiting aspects of an image to reduce its overall size (i.e., compress) while retaining information that can be used to re-establish (i.e., decompress) the image to its original form. Different parameters can be provided to compressors to achieve performance characteristics that best-fit particular environments. For example, higher compression ratios can be used to increase the amount of available storage space within computing devices (e.g., smart phones, tablets, wearables, etc.), but this typically comes at a cost of cycle-intensive compression procedures that consume correspondingly higher amounts of power and time. On the contrary, cycle-efficient compression techniques can reduce power and time consumption, but this typically comes at a cost of correspondingly lower compression ratios and amounts of available storage space within computing devices.

Notably, new compression challenges are arising as computing device capabilities are enhanced over time. For example, enhancements to various sensors in computing devices—e.g., accelerometer sensors, Global Positioning System (GPS) sensors, camera sensors, etc.—are leading to larger file sizes of data that they manage and output, thereby creating new storage space challenges. Although average storage space availability is also being increased over time, it can nonetheless be desirable to achieve effective compression ratios without requiring cycle-intensive approaches. For example, it can be desirable to efficiently store calibration data for image sensors—e.g., image sensors that output single-channel images—so that the image sensors can properly function as images are captured and stored.

SUMMARY OF INVENTION

Accordingly, representative embodiments set forth herein disclose different techniques for pre-processing single-channel images—e.g., calibration images for single-channel image sensors—in a manner that can enhance resulting compression ratios when the pre-processed single-channel images are provided to lossless compressors.

One embodiment sets forth a method for performing lossless compression of single-channel images. According to some embodiments, the method includes a first step of receiving a single-channel image comprised of a collection of pixel intensity values. Next, for each pixel intensity value in the collection of pixel intensity values, the following steps are performed: (i) calculating a predicted pixel intensity value for the pixel intensity value based on at least one neighboring pixel intensity value, (ii) calculating a prediction error for the predicted pixel intensity value by determining a difference between the predicted pixel intensity value and the pixel intensity value, where the prediction error includes a sign bit and magnitude bits, (iii) separating, into a first byte stream: (1) a first group of least significant bits of the magnitude bits, and (2) the sign bit, and (iv) separating, into a second byte stream, a second group of most significant bits of the magnitude bits. Finally, the method includes compressing the respective first byte streams and second byte streams for each pixel intensity value in the collection of pixel intensity values to produce a compressed single-channel image.

Another embodiment sets forth a method for performing lossless compression on a group of single-channel images. According to some embodiments, the method includes a first step of receiving at least two single-channel images, where each single-channel image of the at least two single-channel images is comprised of a plurality of pixel intensity values in a row and a column configuration. Next, an interleaved single-channel image is produced by performing the following step: for each row of each single-channel image of the at least two single-channel images, and for each pixel intensity value included in the row: interleaving the pixel intensity value with a respective pixel intensity value included in the row of the subsequent single-channel image. Finally, the method includes producing a compressed single-channel image by performing the following steps: (i) establishing a byte stream, and (ii) for each pixel intensity value included in the interleaved single-channel image: providing the pixel intensity value to the byte stream, and compressing the byte stream.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

Disclosed herein are different techniques for performing lossless compression of single-channel images (e.g., grayscale images, infrared images, etc.). In particular, the techniques involve pre-processing single-channel images (i.e., prior to compression) in a manner that can enhance resulting compression ratios when the pre-processed single-channel images are compressed using lossless compressors (e.g., Lempel-Ziv-Welch (LZW)-based compressors).

A first technique involves pre-processing an isolated (i.e., one) single-channel image for compression. In particular, the first technique involves calculating predicted pixel intensity values (within the single-channel image) based on neighboring pixel intensity values (also within the single-channel image). Bit values of the error margins of the predicted pixel intensity values are then separated into two different byte streams according to a particular ordering, whereupon the byte streams are separately compressed (e.g., using a LZW-based compressor) and joined together to produce a compressed single-channel image.

A second technique involves pre-processing a group of single-channel images into one single-channel image for compression. In particular, the second technique involves interleaving pixel intensity values of the single-channel images to produce an interleaved single-channel image, and subsequently compressing the interleaved single-channel image (e.g., using an LZW-based compressor).

Accordingly, the techniques set forth herein involve pre-processing single-channel images in a manner that can enhance resulting compression ratios when the pre-processed single-channel images are provided to compressors (e.g., LZW-based compressors). A more detailed description of these techniques is provided below in conjunction with FIGS. 1A-1B, 2-3, 4A-4B, and 5-6.

Figure 1A:
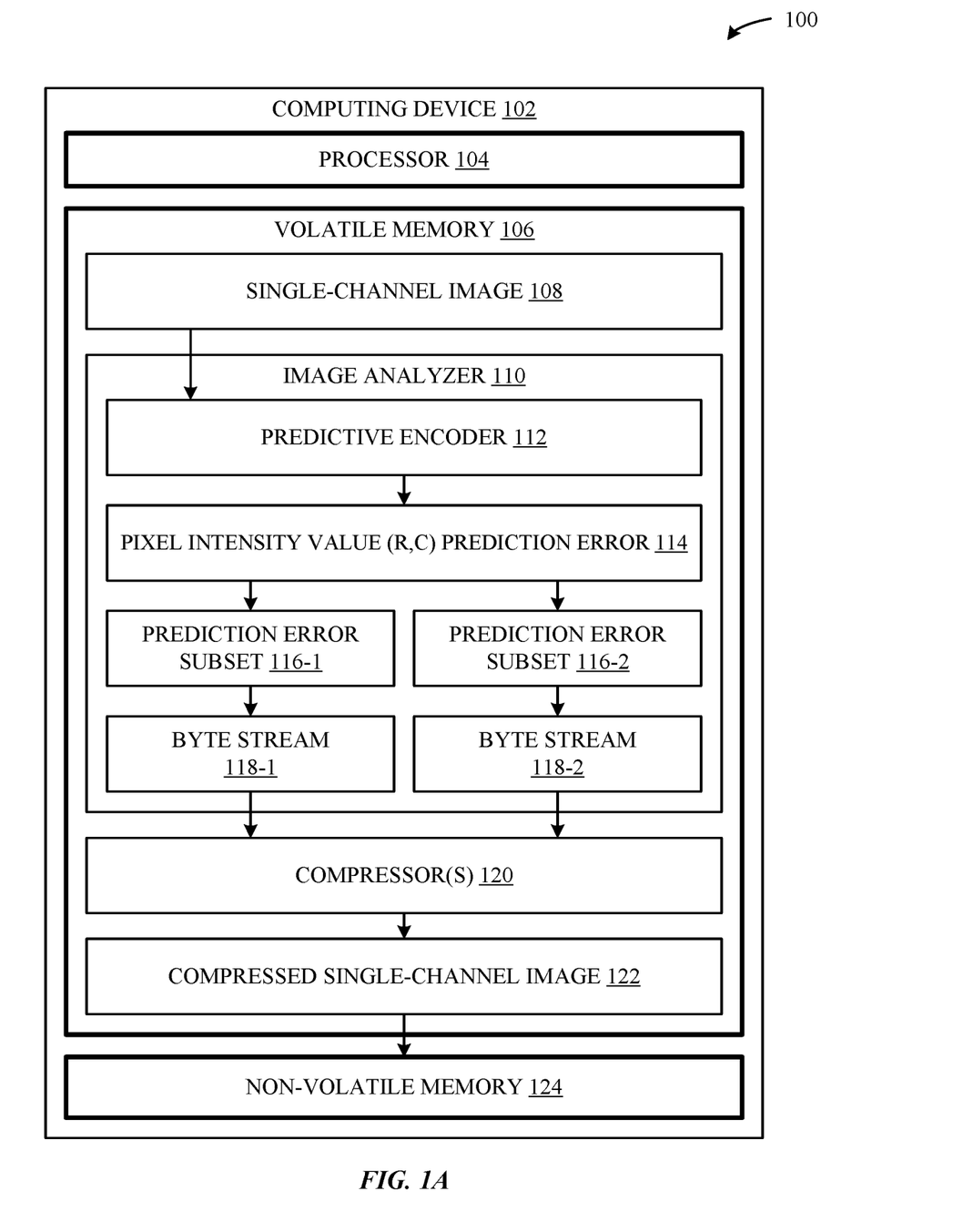
FIGS. 1A-1B illustrate different overviews of a computing device that can be configured to perform the various techniques described herein, according to some embodiments.
Figure 6:
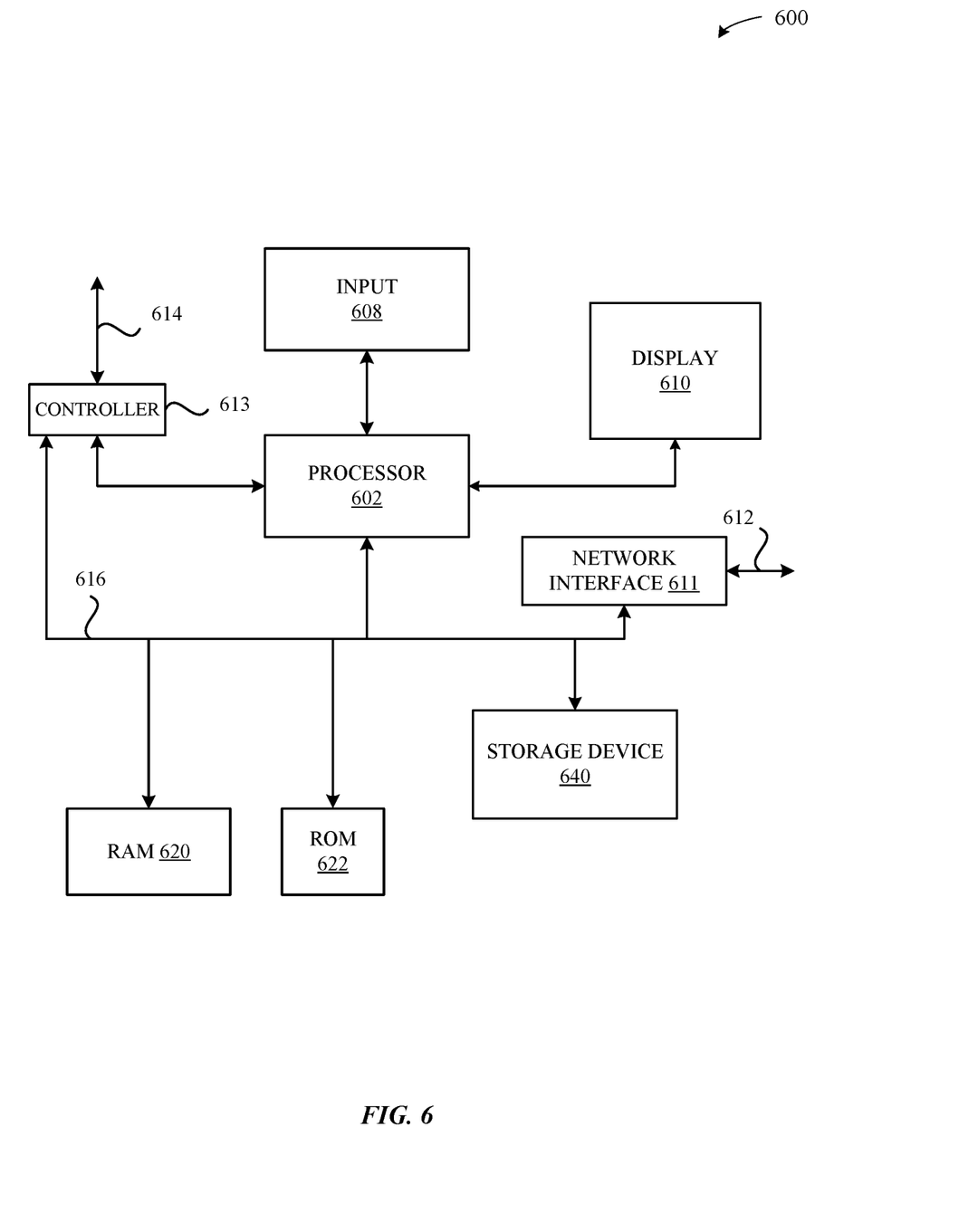
FIG. 6 illustrates a detailed view of a computing device that can be used to implement the various techniques described herein, according to some embodiments.

FIG. 1A illustrates an overview 100 of a computing device 102 that can be configured to perform the various techniques described herein. As shown in FIG. 1A, the computing device 102 can include a processor 104, a volatile memory 106, and a non-volatile memory 124. It is noted that a more detailed breakdown of example hardware components that can be included in the computing device 102 is illustrated in FIG. 6, and that these components are omitted from the illustration of FIG. 1A merely for simplification purposes. For example, the computing device 102 can include additional non-volatile memories (e.g., solid state drives, hard drives, etc.), other processors (e.g., a multi-core central processing unit (CPU)), and so on. According to some embodiments, an operating system (OS) (not illustrated in FIG. 1A) can be loaded into the volatile memory 106, where the OS can execute a variety of applications that collectively enable the various techniques described herein to be implemented. As described in greater detail herein, these applications can include an image analyzer 110, an image analyzer 154 (described below in conjunction with FIG. 1B), one or more compressors 120, and so on.

According to some embodiments, the image analyzer 110 can be configured to implement the first technique described above that involves pre-processing an isolated (i.e., one) single-channel image 108 prior to compressing the single-channel image 108. It is noted that FIGS. 2-3 (and the corresponding descriptions set forth below) provide a more detailed breakdown of the functionality of the image analyzer 110, and that the following description of the image analyzer 110 with respect to FIG. 1A is provided at a high level for simplification purposes.

As shown in FIG. 1A, the single-channel image 108 is received by the image analyzer 110, where the single-channel image 108 is comprised of pixel intensity values that are organized into a pixel row/pixel column layout. Upon receipt of the single-channel image 108, a predictive encoder 112 can be configured to calculate, for each pixel intensity value, a predicted pixel intensity value (within the single-channel image 108) based on neighboring pixel intensity values (also within the single-channel image 108). In turn, the image analyzer 110 calculates, for each predicted pixel intensity value, an error margin of the predicted pixel intensity value by comparing the predicted pixel intensity value against the actual pixel intensity value. Each error margin is illustrated in FIG. 1A as a pixel intensity value (R,C) prediction error 114, where 'R' represents a pixel row within the single-channel image 108 and 'C' represents a pixel column within the single-channel image 108. Next, the image analyzer 110 splits each pixel intensity value (R,C) prediction error 114 into pixel intensity value (R,C) prediction error subsets 116-1/116-2. As shown in FIG. 1A, each of the pixel intensity value (R,C) prediction error subsets 116-1/116-2 can be placed into respective byte streams 118-1/118-2.

As the byte streams 118-1/118-2 are filled with content, the compressor(s) 120 can take action and compress the byte streams 118-1/118-2. According to some embodiments, the compressor(s) 120 can be configured to implement one or more compression techniques for compressing the byte streams 118-1/118-2, e.g., Lempel-Ziv-Welch (LZW)-based compression techniques. Moreover, the compressor(s) 120 can be implemented in any manner to establish an environment that is most-efficient for compressing the byte streams 118-1/118-2. For example, each of the byte streams 118-1/118-2 can be tied to a respective compressor 120 instance such that the byte streams 118-1/118-2 can be simultaneously compressed in parallel. Moreover, the same or a different type of compressor 120 can be applied to each of the byte streams 118-1/118-2 based on the inherent formatting of the byte streams 118-1/118-2. Ultimately, the output(s) of the compressor(s) 120 can be combined (as the pixel intensity values of the single-channel image 108 are pre-processed/compressed) to produce a compressed single-channel image 122, where the compressed single-channel image 122 includes all the necessary data to restore the single-channel image 108 in a lossless manner.

Figure 1B:
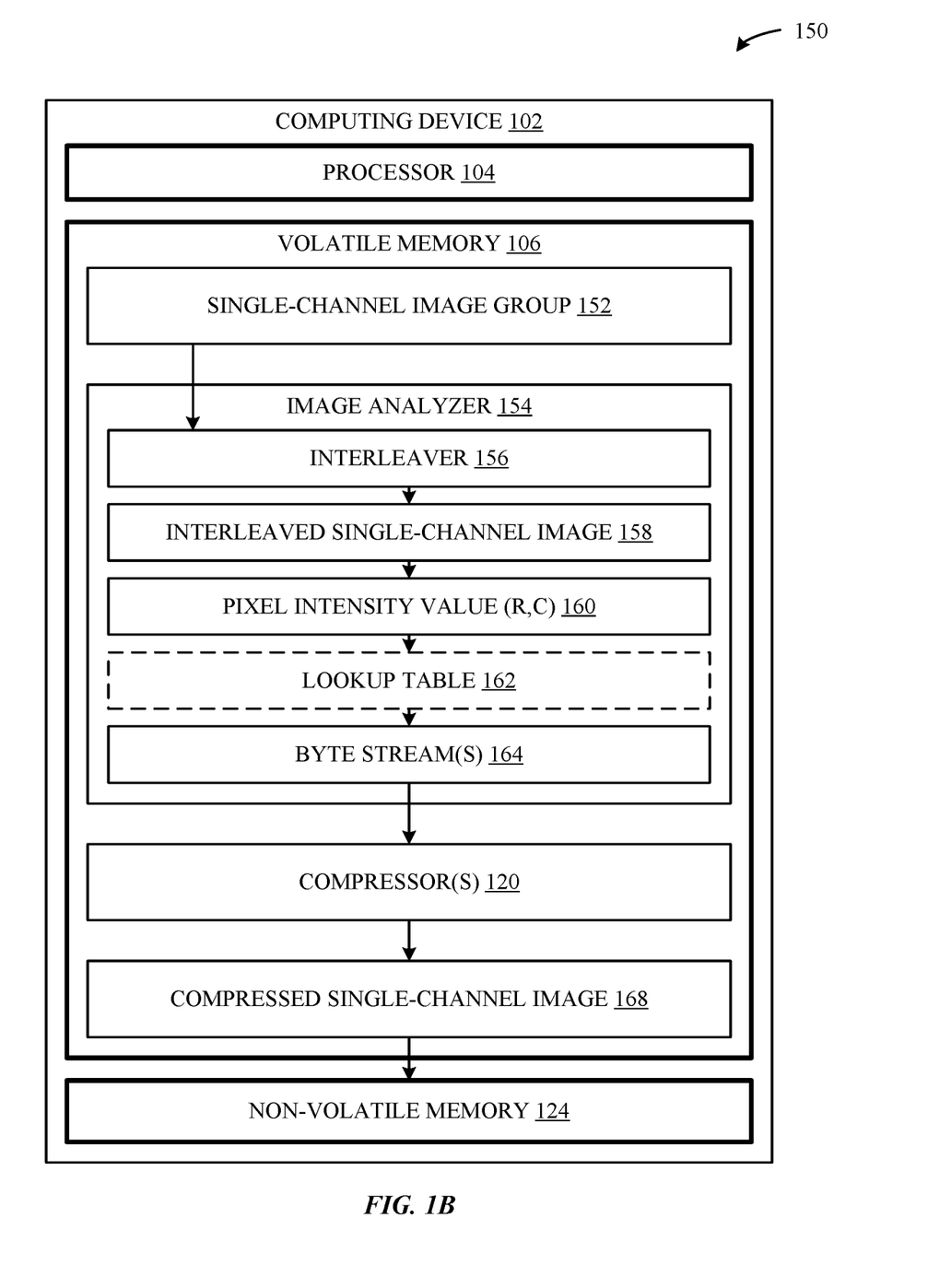

An alternative overview 150 of the computing device 102 is shown in FIG. 1B, where the computing device 102 can be configured to implement an image analyzer 154 (i.e., in addition to or instead of the image analyzer 110). According to some embodiments, the image analyzer 154 is configured to carry out a different pre-processing procedure when a group of similar images is provided for compression. In particular, the image analyzer 110 can be configured to implement the second technique described above that involves pre-processing a group of single-channel images into an interleaved single-channel image prior to compressing the interleaved single-channel image. It is noted that FIGS. 4A-4B and 5 (and their corresponding descriptions set forth below) provide a more detailed breakdown of the functionality of the image analyzer 154, and that the following description of the image analyzer 154 with respect to FIG. 1B is provided at a high level for simplification purposes.

As shown in FIG. 1B, a single-channel image group 152 is received by the image analyzer 110, where the single-channel image group 152 includes two or more single-channel images, and where each single-channel image includes pixel intensity values that are organized into a pixel row/pixel column layout. Upon receipt of single-channel image group 152, an "interleaver" 156 can be used to pre-process the single-channel image group 152. In particular, the interleaver 156 can be configured to interleave the pixel intensity values of the single-channel images in the single-channel image group 152 to produce a single interleaved single-channel image 158 that is comprised of pixel intensity values (R,C) 160 (again, where 'R' represents a pixel row within the interleaved single-channel image 158 and 'C' represents a pixel column within the interleaved single-channel image 158). For example, if the single-channel image group 152 is comprised of two single-channel images each having a size of 20×20 pixel intensity values (R,C) 160, then the interleaved single-channel image 158 can have a size of 40×40 pixel intensity values (R,C) 160. However, it is noted that in some cases symmetry within the single-channel image group 152 can be exploited to attain smaller interleaved single-channel image 158 sizes, as will be described below in greater detail in conjunction with FIG. 4A. Subsequently, each pixel intensity value (R,C) 160 can be further-processed by the image analyzer 154 using an optional lookup table 162. In particular, scenarios can arise in which the pixel intensity values (R,C) 160 have a small varying diversity—e.g., only five unique pixel intensity values (R,C) 160 across the interleaved single-channel image 158—and can lead to compression performance issues. To cure this deficiency, the pixel intensity values (R,C) 160 can be converted to modified pixel intensity values in accordance with the lookup table 162 to improve the performance of the compressor(s) 120.

In either case, the pixel intensity values (R,C) 160 are sequentially placed into one or more byte streams 164, whereupon compressor(s) 120 can compress the contents of the byte stream(s) 164 according to the techniques described herein to produce a compressed single-channel image 168. It is noted that any number of byte streams 164/compressors 120 can be used to improve the overall performance of the image analyzer 154, e.g., different byte streams 164 can receive different segments of the pixel intensity values (R,C) 160 and be tied into multiple compressors 120 to achieve a parallel implementation.

Accordingly, FIGS. 1A-1B provide a high-level overview of different hardware/software architectures that can be implemented by computing device 102 in order to carry out the various techniques described herein. A more detailed breakdown of these techniques will now be provided below in conjunction with FIGS. 2-3, 4A-4B, and 5-6.

Figure 2:
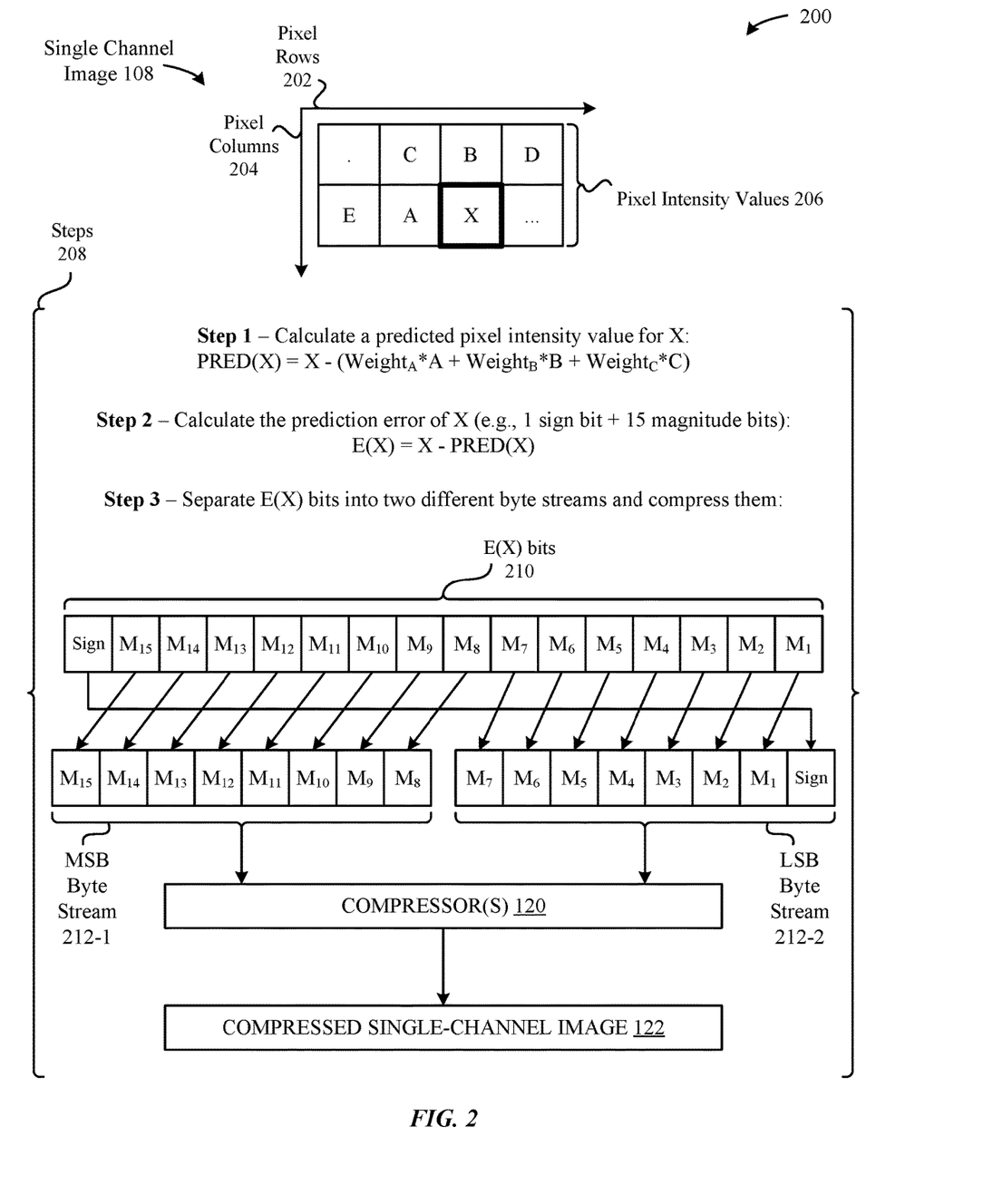
FIG. 2 illustrates a conceptual diagram for pre-processing an isolated single-channel image for compression, according to some embodiments.

FIG. 2 illustrates a conceptual diagram 200 for pre-processing an isolated single-channel image for compression, according to some embodiments. In particular, the conceptual diagram 200 illustrates a series of steps that the image analyzer 110 can be configured to carry out when preparing a single-channel image 108 for compression by the compressor(s) 120. As shown in FIG. 2, the single-channel image 108 can include pixel rows 202 and pixel columns 204 that make up a collection of pixel intensity values 206. It is noted that an example collection of pixel intensity values is illustrated in FIG. 2 with the notations ".", "C", "B", "D", "E", "A", "X", and ". . ." to provide a clear breakdown as to how the image analyzer 110 sequentially calculates predicted pixel intensity values for the pixel intensity values 206, which is described below in greater detail.

As shown in FIG. 2, a series of steps 208 can be carried out by image analyzer 110 when pre-processing the single-channel image 108 prior to utilizing the compressor(s) 120. In particular, Step 1 illustrates an example operation in which the image analyzer 110 calculates a pixel intensity value—labeled "PRED(X)"—for the pixel intensity value having the notation "X". In one example scenario, calculating PRED(X) can involve multiplying the pixel intensity value having the notation "A" by a weighted value "Weight$_A$", multiplying the pixel intensity value having the notation "B" by a weighted value "Weight$_B$", multiplying the pixel intensity value having the notation "C" by a weighted value "Weight$_C$", and summing the products of the multiplications. Next, the sum of the products is subtracted from the pixel intensity value having the notation "X" to produce a final value for PRED(X).

It is noted that the function for PRED(X) illustrated in FIG. 2 and described herein is merely exemplary and that any function (or number of functions) can be utilized when calculating predicted pixel intensity values. For example, fewer or more neighboring pixel intensity values can be incorporated into the prediction function, fewer or more weights can be incorporated into the prediction function, and so on. Moreover, it is noted that the prediction function selection and/or values for the weights can be fine-tuned based on a variety of tests that identify an approach that best-fits different compression goals to be met. For example, prediction functions using different neighboring pixel intensity values, weights, arithmetic, and so on, can be applied to one or more single-channel images 108 upstream from the compressor(s) 120, whereupon the single-channel images 108 are compressed by the compressor(s) 120 and analyzed post-compression to identify the prediction function that yields the most favorable compression properties. It is additionally noted that other considerations can be made for identifying an appropriate prediction function beyond the outputs of the compressor(s) 120, e.g., desired cycle intensities for performing the prediction functions, the overall resolutions of the single-channel images 108, the bit-depths of the pixel intensity values of the single-channel images 108, and so on.

Turning back now to FIG. 2, Step 2 involves calculating the prediction error of X, which is denoted "E(X)" and involves subtracting the value for PRED(X) from the pixel intensity value having the notation "X". As shown in FIG. 2, the prediction error can take on any bit-depth, e.g., a bit depth that corresponds to the bit-depths of the pixel intensity values 206. For example, if each pixel intensity value is an unsigned integer with a length of sixteen bits, then the prediction error can be represented as a signed integer with a length of sixteen bits (as prediction errors can take on positive and negative values). An example of this scenario is illustrated in FIG. 2 by the E(X) bits 210, where fifteen of the bits are magnitude bits one of the bits is a sign bit. It is noted that other bit-lengths can used to store the prediction errors in accordance with the accuracy of the prediction function being used. For example, if it is determined that the prediction errors are reliably fall between negative one-hundred twenty-eight and positive one-hundred twenty-eight, then the prediction errors can be represented as eight bits (i.e., one sign bit and seven magnitude bits).

Next, at Step 3, the image analyzer 110 separates the prediction error into two different byte streams: a most significant bits (MSB) byte stream 212-1 and a least significant bits (LSB) byte stream 212-2. According to some embodiments, eight of the most significant bits of the E(X) bits 210—i.e., M15, M14, M13, M12, M11, M10, M9, and M8—are separated into the MSB byte stream 212-1, and seven of the most significant bits of the E(X) bits 210—i.e., M7, M6, M5, M4, M3, M2, and M1—along with the sign bit of the E(X) bits 210—are separated into the LSB byte stream 212-2. It is noted that the distributions illustrated in FIG. 2 can be modified to achieve similar compression performance. For example, the sign bit can be placed into different positions within the LSB byte stream 212-2, e.g., swapped with M1 or M2, without compromising the performance of the compressor(s) 120 that correspond to the LSB byte stream 212-2. In any case, as prediction errors are provided to the MSB byte stream 212-1 and the LSB byte stream 212-2, the prediction errors are compressed by corresponding compressor(s) 120, and the output(s) of the compressor(s) 120 are combined to produce the compressed single-channel image 122.

It is noted that the example distribution of the E(X) bits 210 illustrated in FIG. 2 can lead to higher compression performance for a variety of reasons. For example, the E(X) bits 210 placed into the LSB byte stream 212-2 likely will have varying entropy due to the expected distribution curve of the prediction errors (i.e., where low-value prediction errors occur at a substantially higher rate than high-value prediction errors). In this case, the compressor(s) 120 tied to the LSB byte stream 212-2 can normalize this entropy to achieve satisfying compression ratios. Moreover, the E(X) bits 210 placed into the MSB byte stream 212-1 likely will represent low values/consistent entropy (again, due to the aforementioned expected distribution curve of the prediction errors). Consequently, the compressor(s) 120 tied to the MSB byte stream 212-1 can also compress the prediction errors in an efficient manner to achieve satisfying compression ratios.

Figure 3:
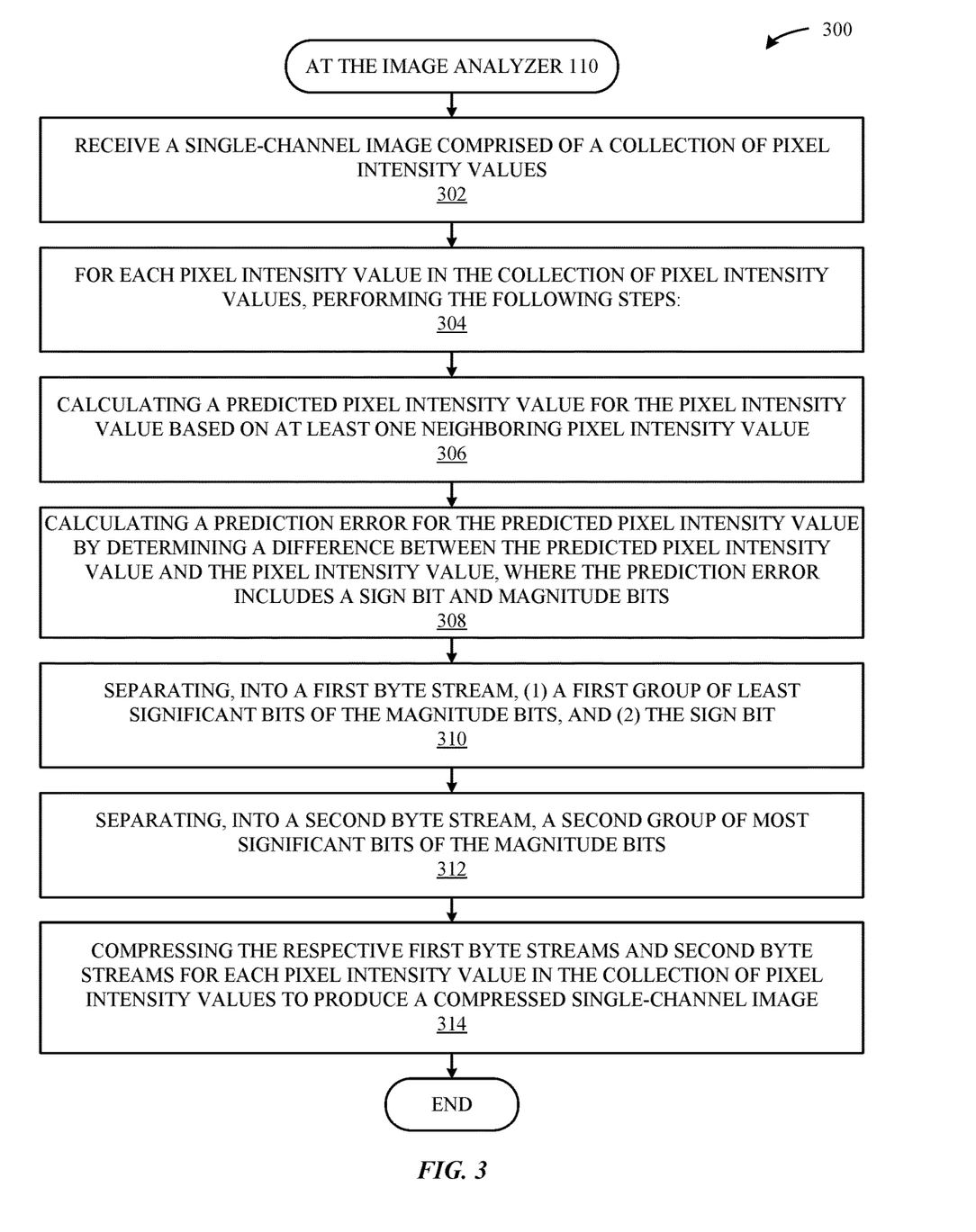
FIG. 3 illustrates a method for pre-processing an isolated single-channel image for compression, according to some embodiments.

FIG. 3 illustrates a method 300 for pre-processing an isolated single-channel image for compression, according to some embodiments. As shown in FIG. 3, the method 300 begins at step 302, where the image analyzer 110 receives a single-channel image comprised of a collection of pixel intensity values. At step 304, the image analyzer 110, for each pixel intensity value in the collection of pixel intensity values, performs steps 306-312. In particular, at step 306, the image analyzer 110 calculates a predicted pixel intensity value for the pixel intensity value based on at least one neighboring pixel intensity value (e.g., as described above in Step 1 of FIG. 2). At step 308, the image analyzer 110 calculates a prediction error for the predicted pixel intensity value by determining a difference between the predicted pixel intensity value and the pixel intensity value, where the prediction error includes a sign bit and magnitude bits (e.g., as described above in Step 2 of FIG. 2).

At step 310, the image analyzer 110 separates, into a first byte stream, (1) a first group of least significant bits of the magnitude bits, and (2) the sign bit (e.g., as described above in Step 3 of FIG. 2). At step 312, the image analyzer 110 separates, into a second byte stream, a second group of most significant bits of the magnitude bits (e.g., as also described above in Step 3 of FIG. 2). Finally, at step 314, the image analyzer 110 compresses the respective first byte streams and second byte streams for each pixel intensity value in the collection of pixel intensity values to produce a compressed single-channel image (e.g., as also described above in Step 3 of FIG. 2).

Figure 4A:
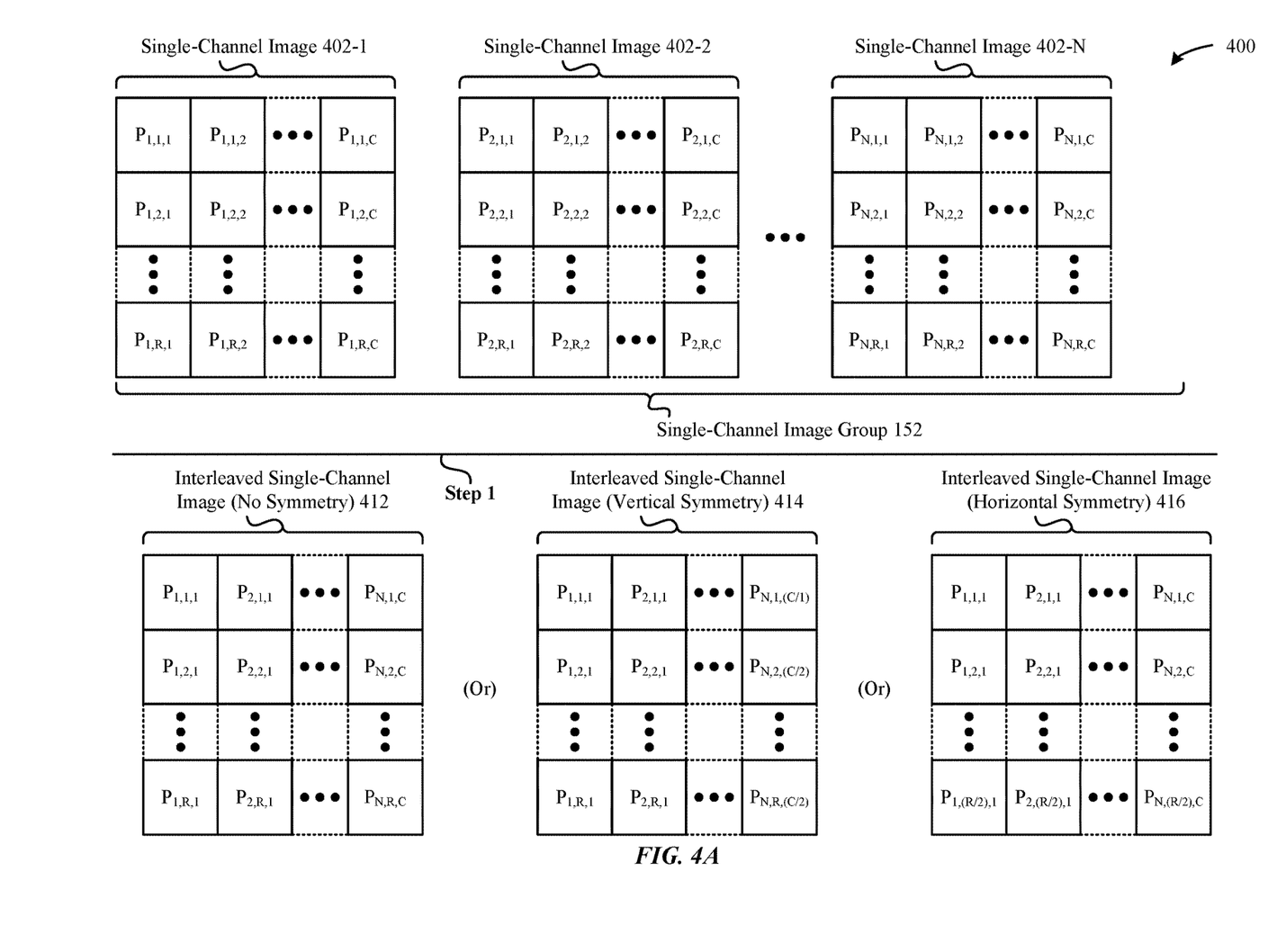
FIGS. 4A-4B illustrate conceptual diagrams for pre-processing a group of single-channel images for compression, according to some embodiments.
Figure 4B:
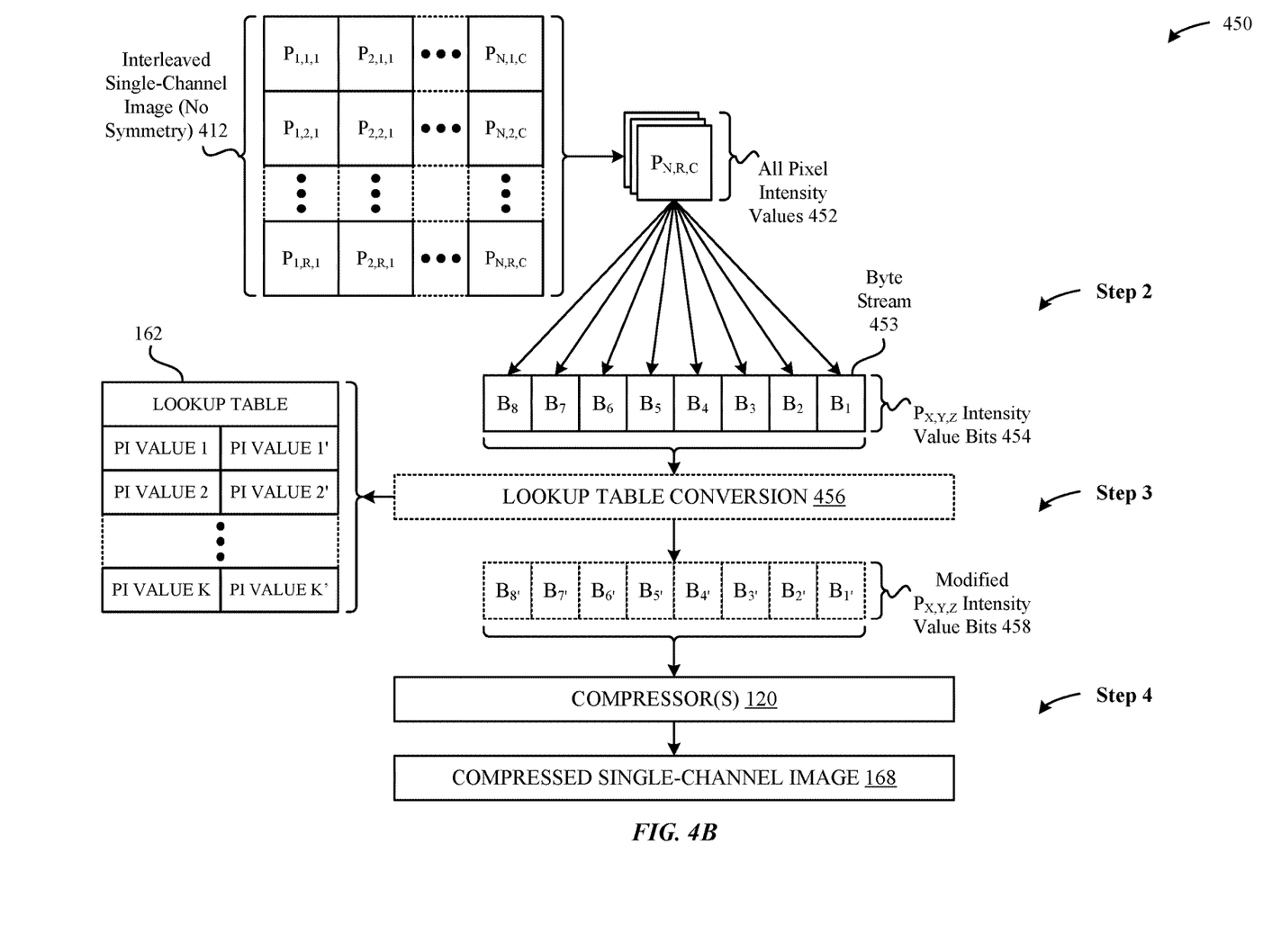

FIGS. 4A-4B illustrate conceptual diagrams 400 and 450 for pre-processing a group of single-channel images for compression, according to some embodiments. In particular, the conceptual diagrams 400 and 450 illustrate a series of steps that the image analyzer 154 can be configured to carry out when preparing a single-channel image group 152 for compression by the compressor(s) 120. As shown in FIG. 4A, the single-channel image group 152 can include multiple single-channel images 402, where each single-channel image 402 includes rows and columns of pixel intensity values. In particular, and as shown in FIG. 4A, the pixel intensity values for each single-channel image 402 are delineated with the notation "$P_{Image\ Number,\ Row\ Number,\ Column\ Number}$". It is noted that the notation scheme illustrated in FIG. 4A is merely used to provide a clearer description of the interleaving operations set forth herein, and that other notations can be utilized to implement the techniques described herein without departing from the scope of this disclosure.

As shown in FIG. 4A, Step 1 can involve the interleaver 156 carrying out a process that involves interleaving each of the pixel intensity values of the single-channel images 402 into an interleaved single-channel image 412 when no symmetry is present across the single-channel images 402. Alternatively, Step 1 can involve disregarding portions of the single-channel images 402 when they are symmetric to avoid storing redundant data that can otherwise be reproduced when decompression/decoding is performed. As illustrated in FIG. 2, when symmetry is not present within the single-channel images 402, all of the pixel intensity values of the images 402 are interleaved to produce the interleaved single channel image 158. Alternatively, when the single-channel images 402 are vertically symmetric, the right-half (or left half) of the single-channel images 402 can be disregarded during the interleaving process, as illustrated in FIG. 2 by the interleaved single-channel image 414. Alternatively, when the single-channel images 402 are horizontally symmetric, the bottom-half (or top half) of the single-channel images 402 can be disregarded during the interleaving process, as illustrated in FIG. 2 by the interleaved single-channel image 416.

It is noted that the interleaving examples illustrated in FIG. 2 do not represent an exhaustive breakdown of the different scenarios that can where the interleaver 156 can identify and exploit redundancies across the 402. For example, when the single-channel images 402 are both vertically and horizontally symmetric, only a single quadrant of the single-channel images 402 can be interleaved to increase efficiency. In another example, when the single-channel images 402 are diagonally symmetrical, a single triangular portion of the single-channel images 402 can be interleaved to increase efficiency. In any scenario, the resulting compressed single-channel image 168 can be tagged with the appropriate information to enable the single-channel images 402 to be fully reconstructed during decompression to a lossless form.

In any case, after the single-channel images 402 are interleaved into an interleaved single channel image 158, Step 2 illustrated in FIG. 4B can be executed. As shown in FIG. 2, Step 2 involves processing, by way of example, the interleaved single-channel image 412 of FIG. 4A, where the interleaved single-channel image 412 includes all of the pixel intensity values from all of the single-channel images 402 included in the single-channel image group 152. As shown in FIG. 2, Step 2 involves placing each of the pixel intensity values included in the interleaved single-channel image 158 into one or more byte streams 453, where each pixel intensity value has an example bit-depth of eight bits (illustrated in FIG. 4B as $Pixel_{X,Y,Z}$ intensity value bits 454).

In is noted that, in some cases, the pixel intensity values across the single-channel images 402 can take on a low number of varying values. This can occur, for example, in sensor calibration images in which a small subset of pixel intensity values is ultimately captured in the single-channel images 402. Notably, such a scenario can degrade the performance of the compressor(s) 120 under some configurations (e.g., LZW-based compressors). For example, if there are only five unique pixel intensity values across the single-channel images 402 (e.g., eight-bit pixel intensity values of two-hundred forty-five, two-hundred forty-six, two-hundred forty-seven, two-hundred forty-eight, and two-hundred forty-nine), then the compressor(s) 120 will be dealing with high values/low entropy that can lead to compression performance degradation. To improve compression ratios in this scenario, the image analyzer 154 can be configured to carry out an optional Step 3 against each of the pixel intensity values as they are placed into the byte stream(s) 453. In particular, Step 3 can involve replacing the pixel intensity value bits 454 with modified pixel intensity value bits (illustrated in FIG. 4B as modified PixelX,Y,Z intensity value bits 458) in accordance with entries of the lookup table 162 in accordance with the illustration of FIG. 4B. For example, each pixel intensity value can map to a unique modified pixel intensity value to enhance the compression ratios that can be achieved. According to some embodiments, when the lookup table 162 is used, the compressed single-channel image 168 can be tagged with information to indicate that the lookup table 162 should be used to reverse the lookup table mappings when performing a decompression/rebuilding of the single-channel images 402.

Finally, at Step 4 in FIG. 4B, the byte stream(s) 453 are provided to the compressor(s) 120, which output compressed data that can be incorporated into the compressed single-channel image 168. Ultimately, the compressed single-channel image 168 can be decompressed/"deinterleaved" to rebuild the collection of single-channel images 402 in a lossless manner.

Figure 5:
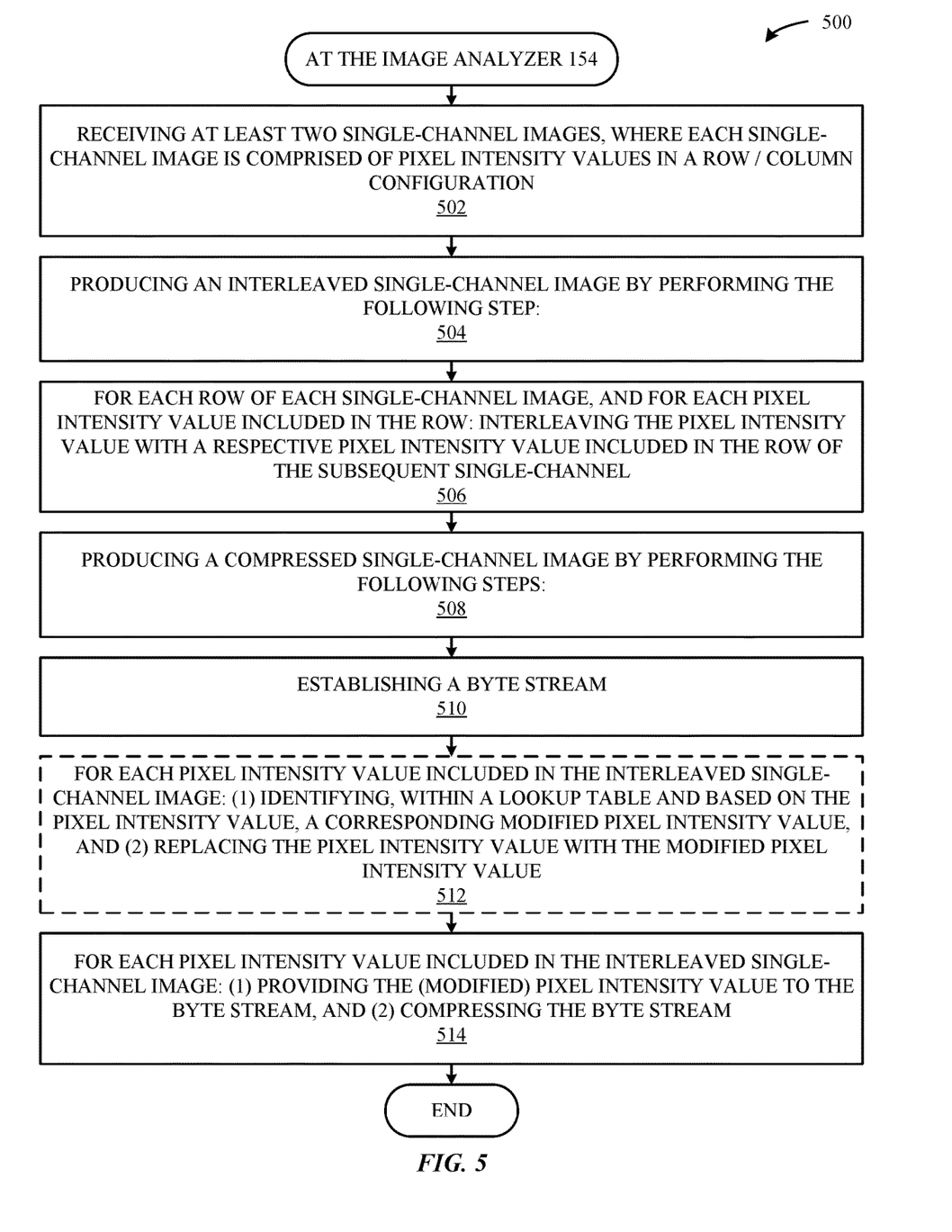
FIG. 5 illustrates a method for pre-processing a group of single-channel images for compression, according to some embodiments.

FIG. 5 illustrates a method 500 for pre-processing a group of single-channel images for compression, according to some embodiments. As shown in FIG. 5, the method 500 begins at step 502, where the image analyzer 154 receives at least two single-channel images, where each single-channel image is comprised of pixel intensity values in a row/column configuration. At step 504, the image analyzer 154 produces an interleaved single-channel image by performing the techniques described in step 506, where the image analyzer 154, for each row of each single-channel image, and for each pixel intensity value included in the row: interleaves the pixel intensity value with a respective pixel intensity value included in the row of the subsequent single-channel (e.g., as described above in Step 1 of FIG. 4A). At step 508, the image analyzer 154 produces a compressed single-channel image by performing steps 510-514, which are described below in greater detail.

At step 510, the image analyzer 154 establishes a byte stream (e.g., as described above in Step 2 of FIG. 4A). At optional step 512, the image analyzer 154, for each pixel intensity value included in the interleaved single-channel image: (1) identifies, within a lookup table and based on the pixel intensity value, a corresponding modified pixel intensity value, and (2) replaces the pixel intensity value with the modified pixel intensity value (e.g., as described above in Step 3 of FIG. 4A). Finally, at step 514, the image analyzer 154, for each pixel intensity value included in the interleaved single-channel image: (1) provides the pixel intensity value/modified pixel intensity value (when step 512 is executed) to the byte stream, and (2) compresses the byte stream (e.g., as described above in Step 4 of FIG. 4A).

FIG. 6 illustrates a detailed view of a computing device 600 that can be used to implement the various components described herein, according to some embodiments. In particular, the detailed view illustrates various components that can be included in the computing device 102 illustrated in FIGS. 1A-1B. As shown in FIG. 6, the computing device 600 can include a processor 602 that represents a microprocessor or controller for controlling the overall operation of the computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, and so on. Still further, the computing device 600 can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through and equipment control bus 616. The computing device 600 can also include a network/bus interface 611 that couples to a data link 612. In the case of a wireless connection, the network/bus interface 611 can include a wireless transceiver.

As noted above, the computing device 600 also include the storage device 640, which can comprise a single disk or a collection of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of applications executing on the computing device 102, including the image analyzers 110/154 and the compressor(s) 120.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for performing lossless compression of single-channel images, the method comprising:
   receiving a single-channel image comprised of a collection of pixel intensity values;
   for each pixel intensity value in the collection of pixel intensity values, performing the following steps:
      calculating a predicted pixel intensity value for the pixel intensity value based on at least one neighboring pixel intensity value,
      calculating a prediction error for the predicted pixel intensity value by determining a difference between the predicted pixel intensity value and the pixel intensity value, wherein the prediction error includes a sign bit and magnitude bits,
      separating, into a first byte stream, (1) a first group of least significant bits of the magnitude bits, and (2) the sign bit,
      separating, into a second byte stream, a second group of most significant bits of the magnitude bits, and
      compressing the first and second byte stream using a first and a second compressor, respectively, to produce respective outputs, wherein the first and second compressors separately and concurrently perform a same compression technique; and
   combining the outputs to produce a compressed single-channel image.

2. The method of claim 1, wherein, for each pixel intensity value in the collection of pixel intensity values, the sign bit follows the first group of least significant bits of the magnitude bits.

3. The method of claim 1, wherein the first compressor and/or the second compressor is a Lempel-Ziv-Welch ("LZW") type compressor.

4. The method of claim 1, wherein each pixel intensity value has a bit-depth of 10 bits, 12 bits, 14 bits, or 16 bits in length.

5. The method of claim 1, wherein calculating the predicted pixel intensity value for the pixel intensity value based on at least one neighboring pixel intensity value comprises:
   sampling at least three neighboring pixel intensity values;
   applying respective weights to the at least three neighboring pixel intensity values to produce modified versions of the at least three neighboring pixel intensity values; and
   subtracting, from the pixel intensity value, a summation of the modified versions of the at least three neighboring pixel intensity values.

6. The method of claim 1, wherein the pixel intensity values in the collection of pixel intensity values are processed according to a raster scan order.

7. A computing device configured to perform lossless compression of single-channel images, the computing device comprising:
   at least one processor; and
   at least one memory storing instructions that, when executed by the at least one processor, cause the computing device to carry out steps that include:
      receiving a single-channel image comprised of a collection of pixel intensity values;
      for each pixel intensity value in the collection of pixel intensity values, performing the following steps:
         calculating a predicted pixel intensity value for the pixel intensity value based on at least one neighboring pixel intensity value,
         calculating a prediction error for the predicted pixel intensity value by determining a difference between the predicted pixel intensity value and the pixel intensity value, wherein the prediction error includes a sign bit and magnitude bits,
         separating, into a first byte stream, (1) a first group of least significant bits of the magnitude bits, and (2) the sign bit,
         separating, into a second byte stream, a second group of most significant bits of the magnitude bits, and
         compressing the first and second byte stream using a first and a second compressor, respectively, to produce respective outputs, wherein the first and second compressors separately and concurrently perform a same compression technique; and
      combining the outputs to produce a compressed single-channel image.

8. The computing device of claim 7, wherein, for each pixel intensity value in the collection of pixel intensity values, the sign bit follows the first group of least significant bits of the magnitude bits.

9. The computing device of claim 7, wherein the single-channel image comprises an infrared image.

10. The computing device of claim 7, wherein the first compressor and/or the second compressor is a Lempel-Ziv-Welch ("LZW") type compressor.

11. The computing device of claim 7, wherein each pixel intensity value has a bit-depth of 10 bits, 12 bits, 14 bits, or 16 bits in length.

12. The computing device of claim 7, wherein calculating the predicted pixel intensity value for the pixel intensity value based on at least one neighboring pixel intensity value comprises:

sampling at least three neighboring pixel intensity values;
applying respective weights to the at least three neighboring pixel intensity values to produce modified versions of the at least three neighboring pixel intensity values; and
subtracting, from the pixel intensity value, a summation of the modified versions of the at least three neighboring pixel intensity values.

13. The computing device of claim 7, wherein the pixel intensity values in the collection of pixel intensity values are processed according to a raster scan order.

14. At least one non-transitory computer readable storage medium configured to store instructions that, when executed by at least one processor included in a computing device, cause the computing device to perform lossless compression of single-channel images, by carrying out steps that include:
receiving a single-channel image comprised of a collection of pixel intensity values;
for each pixel intensity value in the collection of pixel intensity values, performing the following steps:
calculating a predicted pixel intensity value for the pixel intensity value based on at least one neighboring pixel intensity value,
calculating a prediction error for the predicted pixel intensity value by determining a difference between the predicted pixel intensity value and the pixel intensity value, wherein the prediction error includes a sign bit and magnitude bits,
separating, into a first byte stream, (1) a first group of least significant bits of the magnitude bits, and (2) the sign bit, and
compressing the first and second byte stream using a first and a second compressor, respectively, to produce respective outputs, wherein the first and second compressors separately and concurrently perform a same compression technique; and
combining the outputs to produce a compressed single-channel image.

15. The at least one non-transitory computer readable storage medium of claim 14, wherein, for each pixel intensity value in the collection of pixel intensity values, the sign bit follows the first group of least significant bits of the magnitude bits.

16. The at least one non-transitory computer readable storage medium of claim 14, wherein the single-channel image comprises an infrared image.

17. The at least one non-transitory computer readable storage medium of claim 14, wherein the first compressor and/or the second compressor is a Lempel-Ziv-Welch ("LZW") type compressor.

18. The at least one non-transitory computer readable storage medium of claim 14, wherein each pixel intensity value has a bit-depth of 10 bits, 12 bits, 14 bits, or 16 bits in length.

19. The at least one non-transitory computer readable storage medium of claim 14, wherein calculating the predicted pixel intensity value for the pixel intensity value based on at least one neighboring pixel intensity value comprises:
sampling at least three neighboring pixel intensity values;
applying respective weights to the at least three neighboring pixel intensity values to produce modified versions of the at least three neighboring pixel intensity values; and
subtracting, from the pixel intensity value, a summation of the modified versions of the at least three neighboring pixel intensity values.

20. The at least one non-transitory computer readable storage medium of claim 14, wherein the pixel intensity values in the collection of pixel intensity values are processed according to a raster scan order.

* * * * *